March 25, 1930.  N. G. JOHNSON  1,752,181
WINDING-UP OF SPRING DRIVEN DEVICES
Filed Dec. 11, 1928   2 Sheets-Sheet 1

N. G. Johnson
INVENTOR

By Marks & Clerk
Attys.

March 25, 1930.　　　N. G. JOHNSON　　　1,752,181
WINDING-UP OF SPRING DRIVEN DEVICES
Filed Dec. 11, 1928　　2 Sheets-Sheet 2

Patented Mar. 25, 1930

1,752,181

UNITED STATES PATENT OFFICE

NEVILLE GEORGE JOHNSON, OF HOVE, ENGLAND

WINDING UP OF SPRING-DRIVEN DEVICES

Application filed December 11, 1928, Serial No. 325,279, and in Great Britain January 4, 1928.

This invention relates to the winding up of the driving spring of talking machines and other spring-driven devices, the object of the invention being to provide improved means for automatically winding up the driving spring before it has completely run down, said means being arranged automatically to become inoperative after the spring has been wound up.

It is known in talking machines, the spring motor of which is wound up by an electric motor, automatically to release a spring-controlled member by the time a record has been completely played, which member closes the circuit of an electric motor, the said circuit being maintained closed by a time element for a predetermined period of time, when it is automatically opened.

The invention consists in causing the resistance of the spring to its being further wound up to effect a mechanical displacement in the transmission gear between the electric motor and the spring when the latter is nearly wound up and thereby mechanically disconnect the electric motor from the winding gear of the spring.

The invention also consists in causing the switch of the electric motor to be automatically opened immediately upon the automatic disconnection between the electric motor and the spring motor.

The invention further consists in the provision of means for automatically locking the spring motor immediately after its winding gear has been disconnected from the electric motor.

A further feature of the invention consists in the special combination of parts for opening the switch of the electric motor and for locking the spring motor after the electric motor and the spring motor have been automatically disconnected.

A still further feature of the invention consists in the special construction of the means controlling the closing of the switch of the electric motor.

The invention also consists in the improved arrangement and construction of the means for winding up the driving spring of talking machines and other spring-driven devices by means of an electric motor as hereinafter more particularly described.

One mode of carrying the invention into effect is illustrated diagrammatically and by way of example in the accompanying drawings, in which:

Figure 4 is a section along the line 4—4 in Figure 3 seen in the direction of the arrow D while Fig. 5 is a section along the line 5—5 in Fig. 1.

Figure 2:
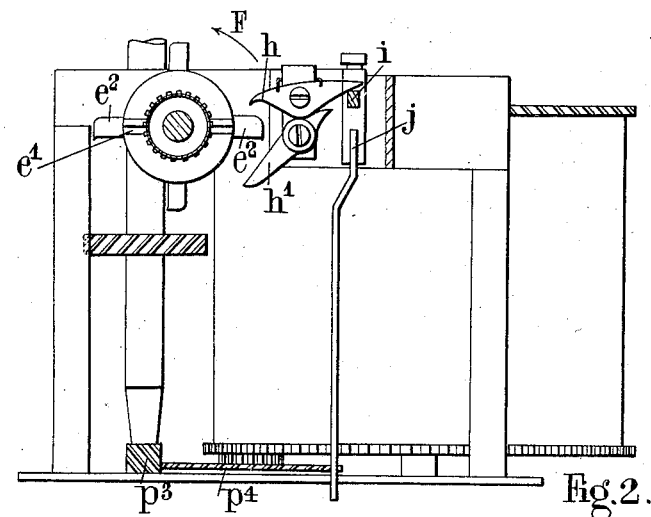
Figure 2 shows in side elevation as seen in the direction of the arrow A in Fig. 1, the engagement between the coupling and the switching mechanism.
Figure 3:
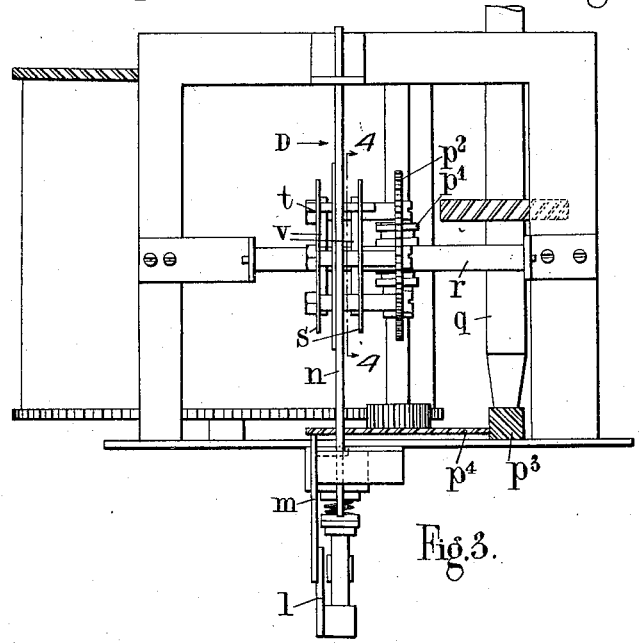
Figure 3 shows in side elevation, as seen in the direction of the arrow B in Fig. 1, the part of the switching mechanism which controls the opening of the switch.

Referring to the drawings, $a$ is the electric motor, $b$ a gear-box, and $c$ a transmission shaft, whilst $d$ is the driven shaft which is connected with the gear for winding up the spring of the talking machine through a worm gear $d_1$, $d_2$, and which corresponds to the spindle to which the winding handle is usually attached, all these parts being mounted on the usual supporting frame E of the spring drive. $e$ is a coupling member secured to the driven shaft $d$, and $f$ a coupling member secured to the transmission shaft $c$ which is capable of sliding in a bearing $c_1$ against the action of a spring $g$. A pinion $c_2$ forming part of the gear interposed between the shaft $c$ and the shaft of the electric motor is mounted on the shaft $c$ in such a manner as to rotate therewith. The coupling member $e$ is provided with wide angled teeth $e_1$ of triangular section, whilst the coupling member $f$ is provided with corresponding recesses $f_1$ in which the said teeth engage. When the motor $a$ is switched on, in the manner hereinafter more particularly referred to, the transmission shaft $c$ turns the driven shaft $d$ through the intermediary of the said coupling, thereby winding up the driving spring of the talking machine, until the same is nearly wound up, the resistance of the spring to its being further wound up being then so great that the coupling member $f$ is forced together with the transmission shaft $c$ by the teeth $e_1$ against the action of the spring $g$, until the said teeth become disengaged from the recesses $f_1$ and the winding gear of the spring becomes disengaged from the electric drive. The driven shaft $d$ starts to rotate in the opposite direction under the action of the spring, which has been wound up, and this reverse rotation of the shaft $d$ in the direction of the arrow F shown in Figure 2 is utilized, as hereinafter referred to, for switching off the electric motor and for stopping its own rotation.

Figure 1:
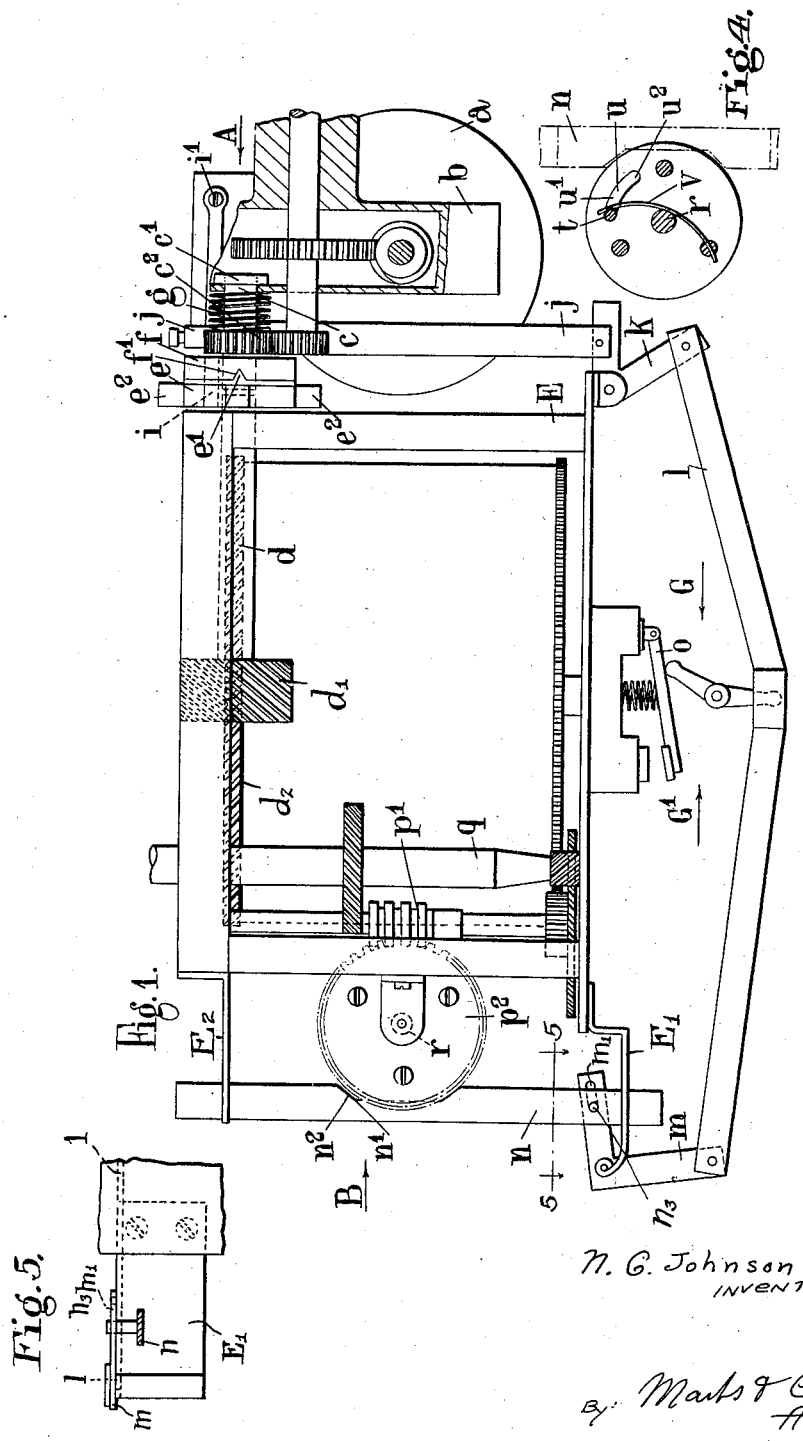
Figure 1 shows in elevation the general arrangement of the electric winding up of the spring and of the means for automatically opening and closing the switch at the required moments.

The coupling member $e$, which is secured to the shaft $d$ and thus rotates therewith, is provided with a series of projections $e_2$ (see Figures 1 and 2), one of which strikes against a pawl $h$ thereby causing it to strike in its turn against the end of a lever $i$ pivoted at $i_1$, and engaging in the link $j$ of the train of links and bell crank levers $j, k, l, m, n,$ which constitute the switching mechanism. The link $n$ is mounted so as to be capable of sliding in the plates $E_1$ and $E_2$ respectively secured to the bottom and top of the frame E and is provided with a pin $n_3$ by which it is supported in a slot $m_1$ provided in the bell-crank lever $m$, the latter being pivotally supported by the plate $E_1$. The striking of the lever $i$ by the pawl $h$ forces the link $j$ downwards and the latter causes in its turn the switch operating link $l$ to be moved in the direction indicated by the arrow G through the intermediary of the bell crank lever $k$ and thereby operate the movable arm of the switch $o$, so as to open the circuit of the electric motor, which is thus prevented from further rotating.

When the pawl $h$ is thus operated by one of the projections $e_2$, in order to open the switch $o$, its movement also acts on a pawl $h_1$ so as to shift it into a position in which it lies in the path of the projections $e_2$, thereby preventing the clutching member $e$, and consequently also the shaft $d$, from further rotating under the action of the spring.

The mechanism for automatically switching on the electric motor when the driving spring has nearly run down will now be described. Through the intermediary of a worm $p_1$ and worm wheel $p_2$, the shaft $r$ is caused to perform one revolution during the running down of the spring to the predetermined point at which the spring requires to be rewound. This can be ensured by the rotation of the worm wheel $p_2$ being made dependent on the rotation of the spindle $q$ on which the turntable is mounted, which dependence is ensured by both the worm $p_1$ and the spindle $q$ being positively geared to the spring motor through the toothed wheels $p_3, p_4$. The shaft $r$ carries along with it two discs $s$ between which is mounted pin $t$ adapted to engage during the rotation of the discs $s$ with the link $n$ which forms part of the switching mechanism and is so moved by the pin $t$ as to cause the switch to be closed. With the object of ensuring that the pin shall not interfere with the reverse movement of the link $n$ for the re-opening of the switch, the pin $t$ is yieldingly mounted on the discs $s$, being arranged to engage in slots $u$ formed in the discs and being preferably carried by two flat springs $v$.

The operation of this part of the apparatus is as follows:—

During the rotation of the discs simultaneously with the rotation of the turn-table, the pin $t$ which lies at the end $u_1$ of the slots $u$ approaches the abutting end $n_2$ of the recess $n_1$ formed in the link $n$ and is gradually depressed by the said abutment against the action of the springs $b$ towards the other end $u_2$ of the slot. The further rotation of the discs causes the pin $t$ to raise the link $n$ and through the intermediary of the bell crank lever $m$ shift the bar $l$ in the direction indicated by the arrow $G_1$ until the switch is operated to close the circuit of the electric motor, which now starts rewinding the spring in the manner hereinbefore described.

The various details of the form of construction hereinbefore given by way of example may be varied without in any way departing from the spirit of the invention.

What I claim is:—

1. In talking machines and other spring-driven devices a driving spring, an electric motor for winding up the driving spring, an automatic electric switch for closing the circuit of the electric motor when the driving spring is to be wound up and for opening it when the driving spring is wound up, a member capable of controlling the closing of the switch in dependence upon the unwinding of the driving spring and a transmission between the driving spring and the electric motor, which transmission includes means capable of disconnecting the electric motor from the driving spring by a mechanical displacement in the said transmission under the action of the resistance offered by the spring to its being further wound up when the same is nearly wound up.

2. In talking machines and other spring-driven devices as claimed in claim 1, means capable of automatically opening the electric switch of the electric motor immediately upon the automatic disconnection between the electric motor and the driving spring.

3. In talking machines and other spring-driven devices as claimed in claim 1, means capable of automatically locking the driving spring practically immediately after the latter has been disconnected from the electric motor.

4. In talking machines and other spring-driven devices as claimed in claim 1, means capable of automatically opening the electric switch of the electric motor immediately upon the automatic disconnection between the electric motor and the driving spring and means capable of automatically locking the driving spring practically immediately after the latter has been disconnected from the electric motor.

5. In talking machines and other spring-driven devices a driving spring, an electric motor for winding up the driving spring, an automatic electric switch for closing the circuit of the electric motor when the driving spring is to be wound up and for opening it when the driving spring is wound up, a member capable of controlling the closing of the switch in dependence upon the unwinding of the driving spring and a transmission between the driving spring and the electric motor, which transmission includes a clutching device capable of disconnecting the electric motor from the driving spring by a mechanical displacement in the said transmission under the action of the resistance offered by the spring to its being further wound up when the same is nearly wound up, in combination with projections and a pivoted member, which projections are capable, immediately upon the release of the clutch, to act by the initial backward rotation of the driving spring on the pivoted member to cause the latter to operate the automatic electric switch and thereby open the circuit of the electric motor and with means for arresting the said backward rotation of the driving spring after its initial rotation.

6. In talking machines and other spring-driven devices as claimed in claim 5, in which the said arresting means comprise a second pivoted member intended to be acted upon by the first pivoted member in order to be brought into the path of the projections and lock the driving spring.

7. In talking machines and other spring-driven devices as claimed in claim 1, in which the member capable of controlling the closing of the switch comprises discs having slots, a pin moving in the said slots and a spring supporting the said pin and in which a member intended to act on the switch is adapted to be operated by the said pin as and for the purpose set forth.

In testimony whereof I have signed my name to this specification.

NEVILLE GEORGE JOHNSON.